United States Patent

Isono et al.

[11] Patent Number: 5,848,558
[45] Date of Patent: Dec. 15, 1998

[54] PEDAL SUPPORT STRUCTURE FOR A VEHICLE

[75] Inventors: Hiroshi Isono; Katsumi Nawata, both of Susono, Japan

[73] Assignee: Toyota Jidosha Kabushiki Kaisha, Aichi-ken, Japan

[21] Appl. No.: 845,486

[22] Filed: Apr. 25, 1997

[30] Foreign Application Priority Data

Apr. 30, 1996 [JP] Japan .................................. 8-109775

[51] Int. Cl.$^6$ .............................. G05G 1/14; B60K 28/14
[52] U.S. Cl. .............................................. 74/512; 180/274
[58] Field of Search .............................. 74/512, 560, 513, 74/514; 180/274, 275, 335

[56] References Cited

U.S. PATENT DOCUMENTS 3,025,713  3/1962  Koshaba et al. .

FOREIGN PATENT DOCUMENTS

| 43 35 511 | 5/1994 | Germany | 180/274 |
|---|---|---|---|
| 44 09 235 | 10/1994 | Germany | 180/274 |
| 44 09 285 | 10/1994 | Germany | 180/274 |
| A-4409324 | 10/1994 | Germany . | |
| 44 15 642 A1 | 12/1994 | Germany . | |
| U-1-73464 | 5/1989 | Japan . | |

OTHER PUBLICATIONS

Abstract of JP09–011,826A, *Database WPI*, Derwent Publications Ltd., Section PQ, Week 9712. Jan. 1997.

*Primary Examiner*—Charles A. Marmor
*Assistant Examiner*—Mary Ann Battista
*Attorney, Agent, or Firm*—Oliff & Berridge, PLC

[57] ABSTRACT

A pedal support structure for a vehicle which can control the displacement of the pad of a vehicle pedal when an external force greater than a predetermined value acts on the vehicle from the front side thereof. The support structure includes a link support for supporting a swing-center shaft of a swing link connected to a brake booster, and a pedal support for supporting a rotation-center shaft of a brake pedal. The link support is connected to the pedal support in a separable manner. The swing link and the brake pedal are connected with each other via a connecting link such that a first connecting pin is located on the front side with respect to a line connecting the rotation-center shaft and the swing-center shaft. Accordingly, when an external force greater than the predetermined value acts on the front portion of the vehicle, the link support separates from the pedal support while turning, so that the distance between the rotation-center shaft and the swing-center shaft is increased. As a result, the first connecting pin is shifted toward the line, so that the pedal pad is moved substantially toward the front of the vehicle.

20 Claims, 6 Drawing Sheets

PEDAL SUPPORT STRUCTURE FOR A VEHICLE

BACKGROUND OF THE INVENTION

1. Field of the Invention

The present invention relates to a pedal support structure for a vehicle.

2. Description of the Related Art

Various kinds of measures have been considered as countermeasures in cases where an external force greater than a predetermined value acts on the vehicle from the front side thereof. One example of such a structure is disclosed in Japanese Utility Model Application Laid-Open (JP-U) No. 1-73464.

Figure 6:
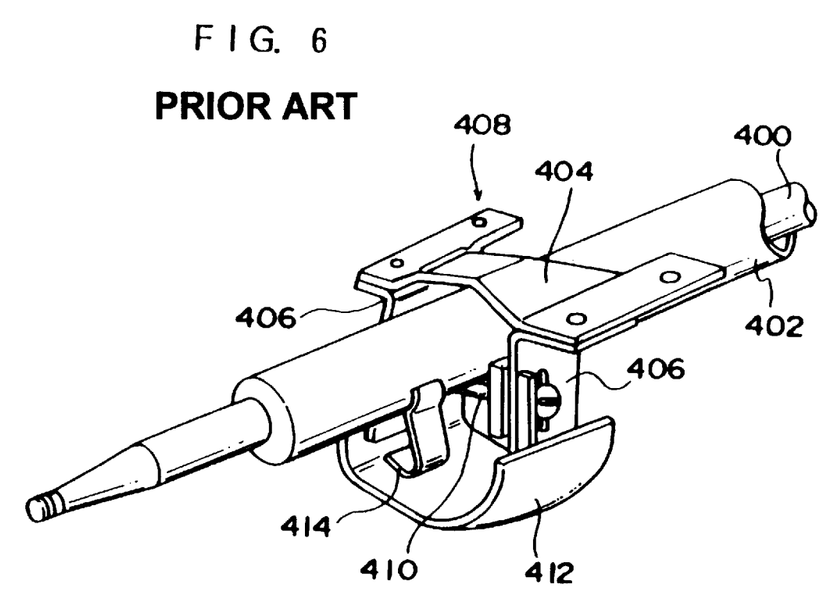
FIG. 6 is a perspective view showing a conventional structure.

As shown in FIG. 6, according to the structure disclosed in the above-cited publication, a steering column 402 covering a steering shaft 400 is supported on the vehicle body side via a tilt bracket 408 comprised of an upper plate member 404 and a pair of side plate members 406, as well as via a shaft 410, which penetrates through the side plate members 406 so as to support the bottom edge of the steering column 402.

Further, an elastically deformable knee protector 412 having a substantially arc shape is disposed under the above-described tilt bracket 408. This knee protector 412 is elastically supported on the lower side of the steering column 402 via an elastically deformable stay 414.

According to the above-described structure, when an external force greater than a predetermined value acts on the vehicle from the front side thereof, an inertial force acts on an occupant such that the occupant moves toward the front of the vehicle. Accordingly, the occupant's legs tend to inertially move toward the front of the vehicle while bending about the knees. In this case, if the knee protector 412 was not disposed, the occupant's knees would contact the tilt bracket 408. By contrast, when the knee protector 412 is disposed under the tilt bracket 408 as described above, the knee(s) of the occupant will only contact the knee protector 412.

The above-described structure employing the knee protector 412 may be effective as countermeasures in cases where an external force greater than a predetermined value acting on the vehicle from the front side thereof. However, there are any other measures approached from a different point of view as countermeasures relating to occupant's legs. For multilevel protection, it is important to provide multiple measures relating to occupant's legs.

In view of the foregoing, the inventors of the present invention carried out various experiments and reached the conclusion that it is very effective to control the displacement of a vehicle pedal such as a brake pedal, taking into consideration deformation and displacement behavior of a body panel and the like in cases where an external force greater than a predetermined value acts on the vehicle from the front side thereof.

SUMMARY OF THE INVENTION

In view of the above, it is an object of the present invention to provide a pedal support structure for a vehicle capable of controlling the displacement of the pad of a vehicle pedal when an external force greater than a predetermined value acts on the vehicle from the front side thereof.

According to a first aspect of the present invention, there is provided a pedal support structure for a vehicle comprising: a pedal bracket fixed on a vehicle body and supporting a rotation-center shaft of a suspension type vehicle pedal; a swing link which is supported by the pedal bracket in a manner swingable about a swing-center shaft and one end portion of which is connected to operating-force transmission means for transmitting a treading force applied to the pad of the vehicle pedal to treading-force boosting means; a connecting link which connects the other end portion of the swing link and one end portion of the vehicle pedal opposite to the pad in a relatively rotatable manner, which transmits a rotational forth of the vehicle pedal, generated about a rotation-center shaft of the vehicle pedal and toward the front of the vehicle, to the operating-force transmission means via the swing link, and in which a connecting pin for connection with the end portion of the vehicle pedal opposite to the pad is offset substantially toward the front of the vehicle or toward the top of the vehicle from a line connecting the rotation-center shaft of the vehicle pedal and the swing-center shaft of the swing link; and displacement control means which operates, when an external force greater than a predetermined value acts on the front portion of the vehicle, so as to increase the distance between the rotation-center shaft and the swing-center shaft and to shift the connecting pin toward the line, thereby displacing the pad of the vehicle pedal.

According to a second aspect of the present invention, in the pedal support structure for a vehicle according to the first aspect, the displacement control means comprises first and second brackets which constitute the pedal bracket, the first bracket supporting the rotation-center shaft of the vehicle pedal and the second bracket supporting the swing-center shaft of the swing link and disposed above the first bracket, so that the second bracket is moved away from the first bracket when an external force greater than a predetermined value acts on the front portion of the vehicle.

According to a third aspect of the present invention, in the pedal support structure for a vehicle according to the first or second aspect, there is provided releasing means for releasing the connection, established by the connecting link, between the other end portion of the swing link and the end portion of the vehicle pedal opposite to the pad when the distance between the rotation-center shaft and the swing-center shaft increases.

According to the first aspect of the present invention, when an external force greater than a predetermined value acts on the front portion of the vehicle, the displacement control means causes the distance between the rotation-center shaft of the vehicle pedal and the swing-center shaft of the swing link to increase. Further, in this case, the connecting pin of the connecting link, which is offset substantially toward the front of the vehicle or toward the top of the vehicle from the line connecting the rotation-center shaft of the vehicle pedal and the swing-center shaft of the swing link, is displaced toward the line. Thus, a torque is applied to the vehicle pedal so as to turn the vehicle pedal about the rotation-center shaft toward the front of the vehicle. In this manner, the displacement of the pad of the vehicle pedal is controlled when an external force greater than a predetermined value acts on the vehicle from the front side thereof.

According to the second aspect of the present invention, when an external force greater than a predetermined value acts on the front portion of the vehicle, the displacement control means causes the second bracket disposed above the first bracket supporting the rotation-center shaft of the vehicle pedal to move away from the first bracket. Since the swing-center shaft of the swing link is supported by the second bracket, the distance between the swing-center shaft of the swing link and the rotation-center shaft of the vehicle pedal increases as the second bracket moves away from the first bracket.

According to the third aspect of the present invention, when the distance between the rotation-center shaft and the swing-center shaft increases, the releasing means releases the connection, established by the connecting link, between the other end portion of the swing link and the end portion of the vehicle pedal opposite to the pad. Accordingly, the vehicle pedal is released from the connecting link, thereby utilizing an inertial force directed substantially toward the front of the vehicle and acting on the vehicle pedal for displacing the pad of the vehicle pedal when an external force greater than a predetermined value acts on the vehicle from the front side thereof.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein.

DESCRIPTION OF THE PREFERRED EMBODIMENTS

Supplements to the Embodiments (1) In the description of a second and subsequent embodiments, parts and portions identical to or substantially identical to those appearing in the description of a first embodiment are indicated by reference numerals identical to those of corresponding parts and portions appearing in the description of the first embodiment, and the descriptions of the structure, action, etc. of these parts and portions will be omitted.

(2) The embodiments described below encompass a suspension type main brake pedal. However, the present invention is not limited thereto, but is also applicable to a suspension type clutch pedal and a suspension type parking brake pedal.

First Embodiment

A first embodiment of the present invention will now be described with reference to FIGS. 1 and 2.

Figure 1:
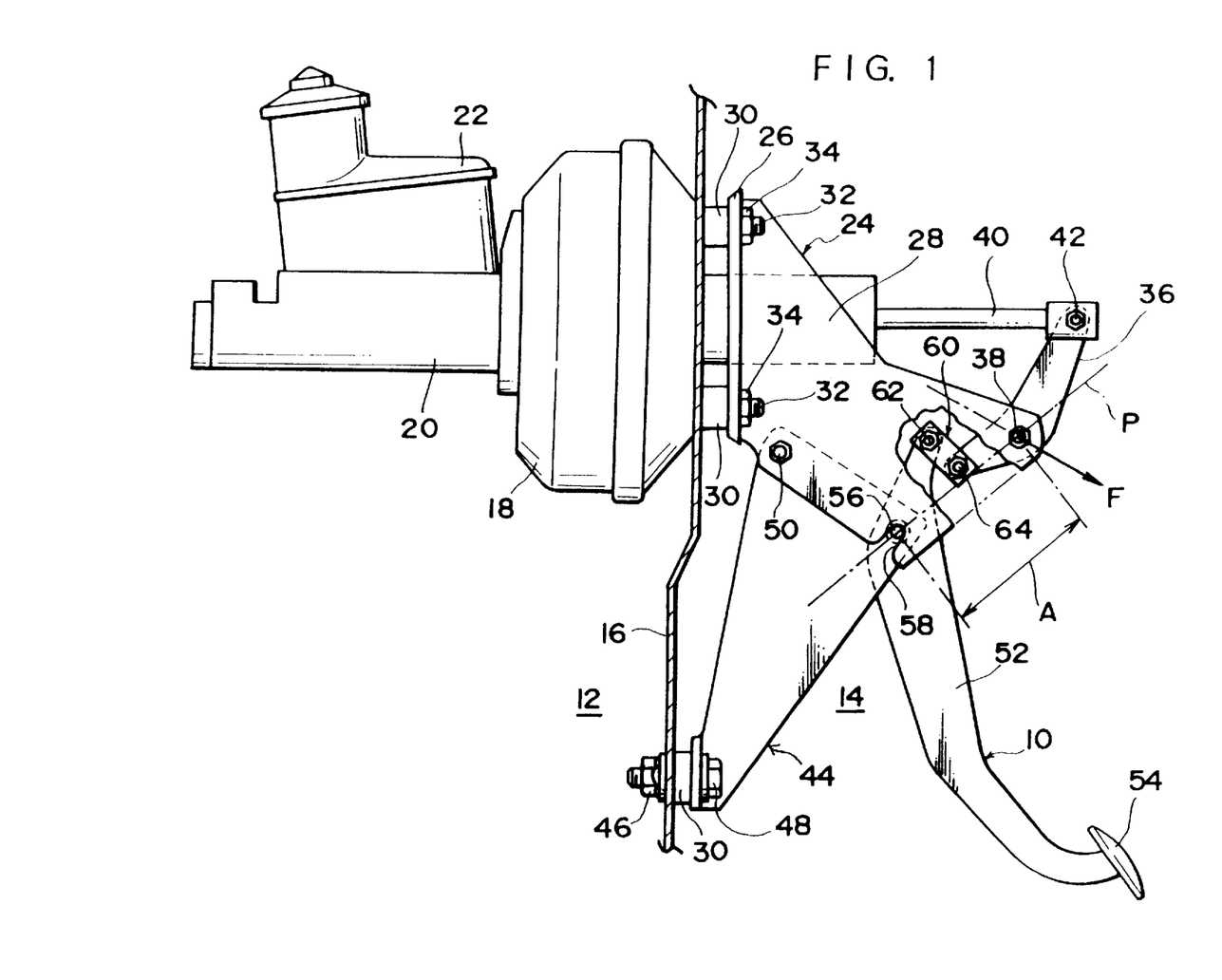
FIG. 1 is a side view showing a pedal support structure for a vehicle according to a first embodiment of the present invention.

FIG. 1 schematically shows the side view of a suspension type brake pedal 10 and its peripheral structure. As shown in FIG. 1, a dash panel 16 is substantially vertically disposed so as to separate an engine room 12 from a compartment space 14. On the front side of the dash panel 16, there are integrally disposed a brake booster 18 for boosting a treading force applied by an occupant to the brake pedal 10, a master cylinder 20 for converting a pressure boosted by the brake booster 18 to a fluid pressure, and a reservoir tank 22 for storing and replenishing brake fluid in accordance with a change of volume of a hydraulic system.

A link support 24 is disposed on the rear side of the dash panel 16. This link support 24 comprises a base plate 26 and a side plate 28. The base plate 26 is disposed in parallel with the dash panel 16. The side plate 28, having a substantially rectangular shape, is supported by the base plate 26 in a cantilever manner and extends toward the rear of the vehicle such that its plane is oriented along the longitudinal direction of the vehicle.

A plurality of cylindrical collars 30 are fixed on the front-side surface of the base plate 26 of the link support 24 at predetermined positions. These collars 30 abut the dash panel 16 such that stud bolts 32 projecting from the brake booster 18 are inserted into the corresponding collars 30. Nuts 34 are screwed onto the stud bolts 32 from the compartment side, so that the link support 24 is fixed onto the dash panel 16. An unillustrated dash insulator, serving as a noise insulating material, is interposed between the dash panel 16 and the base plate 26. Alternatively, nuts may be welded onto the front-side surface of the dash panel 16, and mounting bolts may be passed through the base plate 26 and screwed into the welded nuts to thereby fix the base plate 26 onto the dash panel 16.

A swing-center shaft 38 for a swing link 36, having a boomerang-like shape as viewed from its side, is supported by the link support 24 at its rear end portion. The swing-center shaft 38 is located at the intermediate portion of the swing link 36. The upper end portion of the swing link 36 is connected to the tip portion of a push rod 40 projecting from the brake booster 18 such that the swing link 36 can rotate about a hinge pin 42 located at the tip portion of the push rod 40.

A pedal support 44, having a substantially triangular shape as viewed from its side, is disposed under the link support 24. Cylindrical collars 30 are fixed on the front-side surface of the bottom end portion of the pedal support 44 at predetermined positions. The collars 30 also abut the dash panel 16. Mounting bolts 48 are inserted into the collars 30 from the compartment side and are screwed into nuts 46 welded onto the front-side surface of the dash panel 16, thereby fixing the pedal support 44 onto the dash panel 16.

The upper front end portion of the pedal support 44 and the lower front end portion of the link support 24 are pivotably connected by a support shaft 50. A rotation-center shaft 56 of the brake pedal 10 is supported by the pedal support 44 at its upper rear end portion. The brake pedal 10 comprises a pedal support member 52 formed by adequately bending a narrow plate material and a pedal pad 54 attached to the bottom end portion of the pedal support member 52. The rotation-center shaft 56 is located at the intermediate portion of the pedal support member 52 offset toward the top end of the pedal support member 52. The rotation-center shaft 56 is pivotably engaged with a cut-away portion 58 having an inverse U-shape and formed in the side plate 28 of the link support 24 at its lower rear end portion.

The upper end portion of the pedal support member 52 and the lower end portion of the swing link 36 are pivotably connected via a straight connecting link 60. Specifically, the front end portion of the connecting link 60 and the upper end portion of the pedal support member 52 are hinged by a first connecting pin 62, while the rear end portion of the connecting link 60 and the lower end portion of the swing link 36 are hinged by a second connecting pin 64. Further, the first connecting pin 62 is offset substantially toward the front of the vehicle from a line P connecting the rotation-center shaft 56 of the brake pedal 10 and the swing-center shaft 38 of the swing link 36.

Next, the operation and effects of the present embodiment will be described.

In an ordinary traveling state of the vehicle, the brake pedal 10 is held at its initial position by the urging force of a return spring. In this state, when a occupant applies a treading force to the pedal pad 54 of the brake pedal 10, the brake pedal 10 swings about the rotation-center shaft 56 toward the front of the vehicle. This swing motion is transmitted to the swing link 36 via the connecting link 60, thereby causing the swing link 36 to swing about the swing-center shaft 38 in a counterclockwise direction on FIG. 1. This causes the push rod 40 to be pushed substantially toward the front of the vehicle. As a result, the treading force applied to the pedal pad 54 by the occupant is boosted by the brake booster 18.

Since the rotation-center shaft 56 of the brake pedal 10 is located under a line along which a load F acts on the swing-center shaft 38 substantially toward the rear of the vehicle upon an ordinary braking operation, a support rigidity is sufficiently secured during the ordinary braking operation, so that the feeling of a pedal operation is not impaired.

Figure 2:
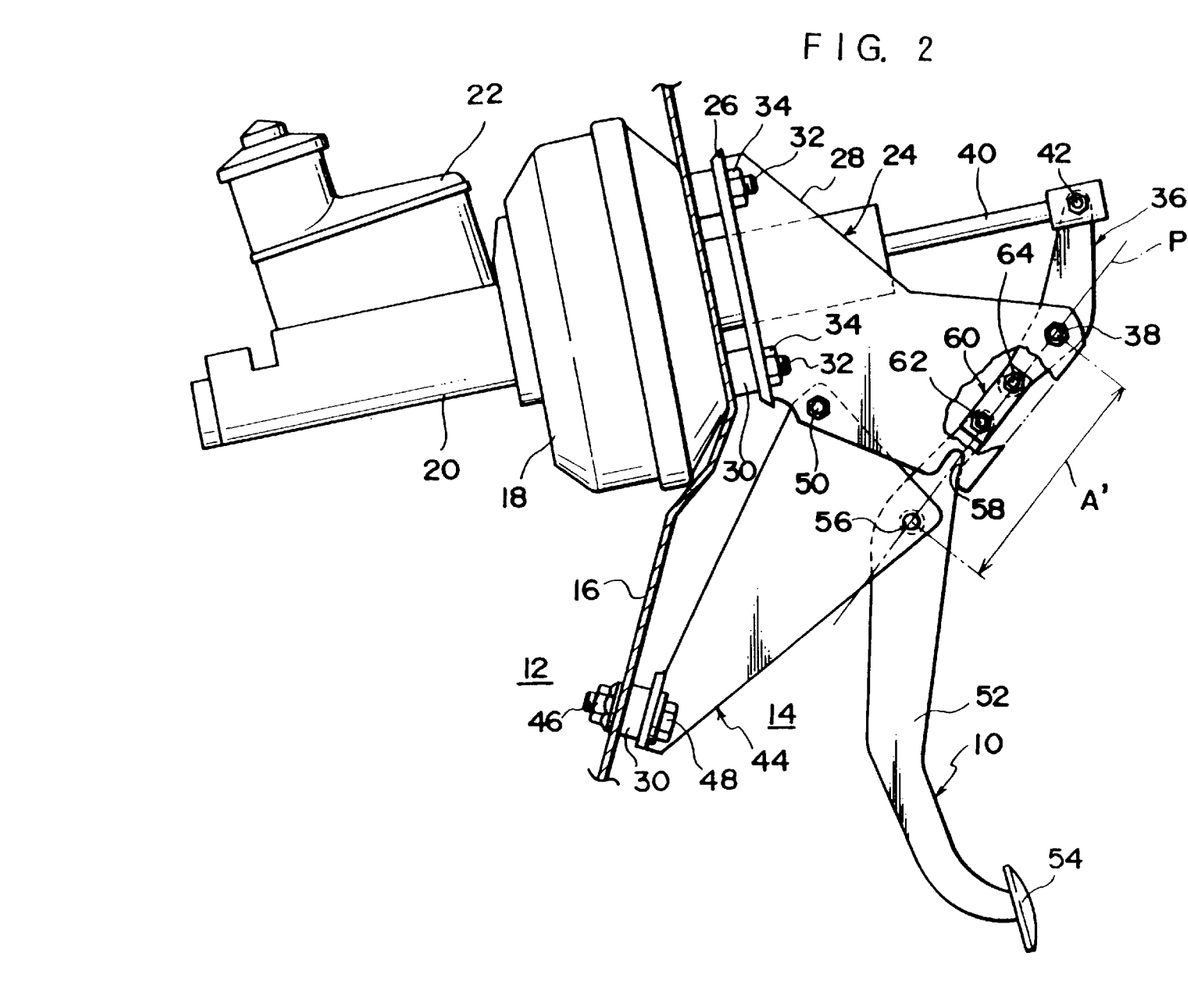
FIG. 2 is a side view of the structure of FIG. 1 showing a state after an external force greater than a predetermined value acts on the vehicle from the front side thereof.

By contrast, when an external force greater than a predetermined value acts on the vehicle from the front side thereof, the load corresponding to the external force is input to the dash panel 16 via a front-side member, and thus the dash panel 16 may bend toward the rear of the vehicle as shown in FIG. 2. In such a case, the link support 24 turns upward (is pushed upward) about the support shaft 50, so that the cut-away portion 58 formed in the link support 24 is disengaged from the rotation-center shaft 56 of the brake pedal 10. This causes a distance A (see FIG. 1) between the rotation-center shaft 56 of the brake pedal 10 and the swing-center shaft 38 of the swing link 36 to increase to a distance A' (see FIG. 2). Also, the connecting link 60 is substantially aligned with the line P connecting the rotation-center shaft 56 and the swing-center shaft 38. That is, in addition to the second connecting pin 64, which connects the connecting link 60 and the swing link 36, the first connecting pin 62, which connects the connecting link 60 and the pedal support member 52, is drawn toward the line P. As a result, a torque is applied to the brake pedal 10 such that the brake pedal 10 turns about the rotation-center shaft 56 so as to move the pedal pad 54 substantially toward the front of the vehicle.

As described above, in the present embodiment, the swing link 36 and the brake pedal 10 are connected by the connecting link 60, and the link support 24, which supports the swing-center shaft 38 of the swing link 36, is separably engaged with the pedal support 44, which supports the rotation-center shaft 56 of the brake pedal 10. Furthermore, the first connecting pin 62, which connects the connecting link 60 and the brake pedal 10, is offset substantially toward the front of the vehicle from the line P connecting the rotation-center shaft 56 and the swing-center shaft 38. Therefore, when an external force greater than the predetermined value acts on the vehicle from the front side thereof, the distance between the rotation-center shaft 56 and the swing-center shaft 38 is increased from A to A', so that the first connecting pin 62 can be drawn toward the line P. Thus, the pedal pad 54 of the brake pedal 10 can be displaced substantially toward the front of the vehicle. In other words, according to the present embodiment, when an external force greater than the predetermined value acts on the vehicle from the front side thereof, the associated deformation of the dash panel 16 is utilized for displacing the pedal pad 54 substantially toward the front of the vehicle. As a result, when an external force greater than the predetermined value acts on the vehicle from the front side thereof, an occupant's legs can be prevented from excessively bending about the knees, which would otherwise result due to an inertial movement of the occupant. This makes it possible to keep the occupant's knees away from a steering column.

In the present embodiment, the pedal bracket is divided into the link support 24, which supports the swing-center shaft 38 of the swing link 36, and the pedal support 44, which supports the rotation-center shaft 56 of the brake pedal 10. Therefore, when an external force greater than the predetermined value acts on the vehicle from the front side thereof, the distance between the rotation-center shaft 56 and the swing-center shaft 38 can be increased merely by turning the link support 24 relative to the pedal support 44 about the support shaft 50. That is, the distance between the rotation-center shaft 56 and the swing-center shaft 38 can be increased through the employment of a simple structure. In other words, the present embodiment provides a simple structure.

In the present invention, the pedal bracket comprises two separate members, i.e. the link support 24 and the pedal support 44. However, the present invention is not limited thereto. The link support 24 and the pedal support 44 may be formed as a single member. In this case, a crack-generating portion such as a slit, a thin-walled portion, or the like may be provided so that a portion corresponding to the link support 24 can separate from a portion corresponding to the pedal support 44 when an external force greater than the predetermined value acts on the vehicle from the front side thereof.

Second Embodiment

A second embodiment of the present invention will next be described with reference to FIGS. 3 and 4.

Figure 3:
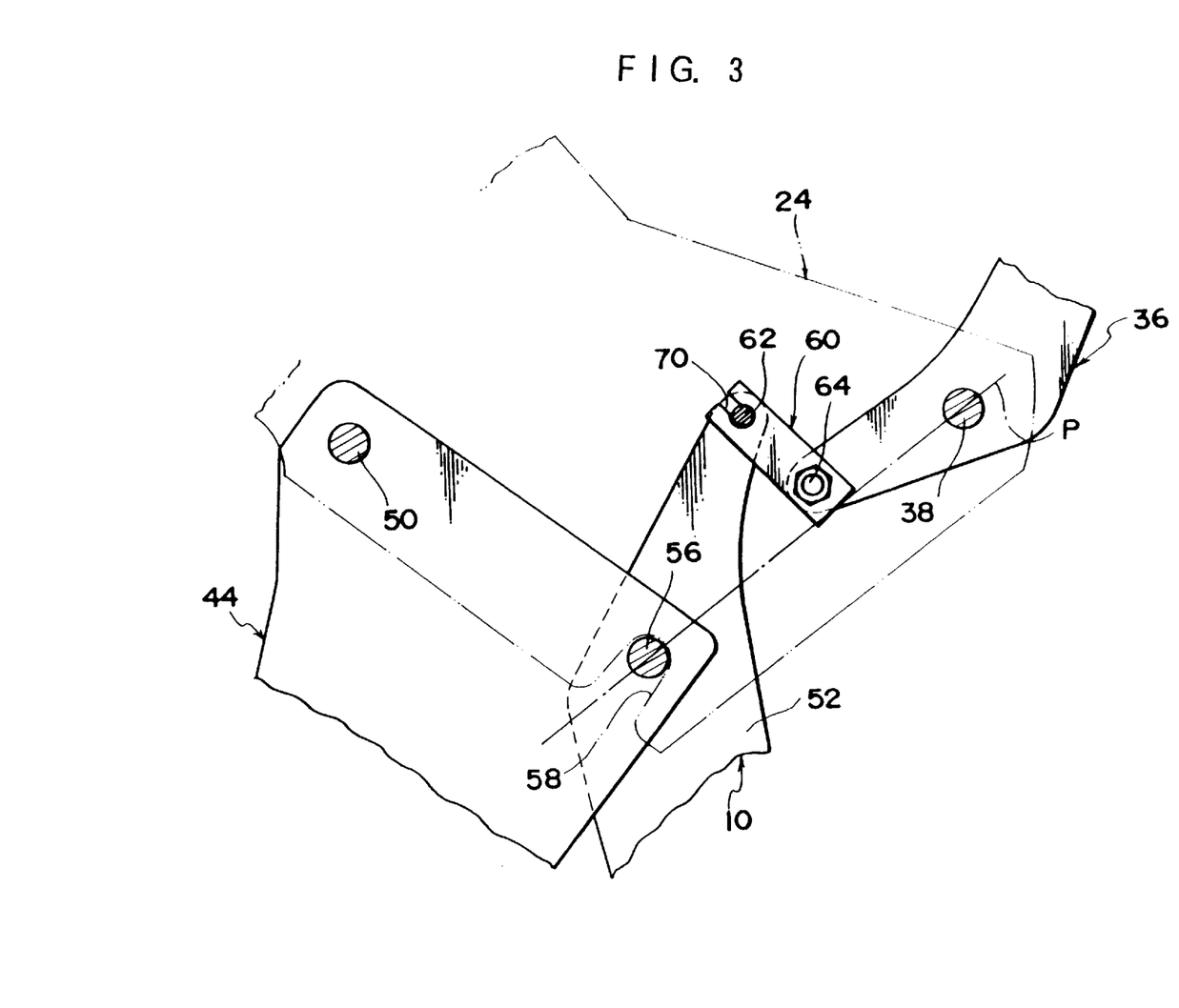
FIG. 3 is an enlarged side view showing a main portion of a pedal support structure for a vehicle according to a second embodiment of the present invention.
Figure 4:
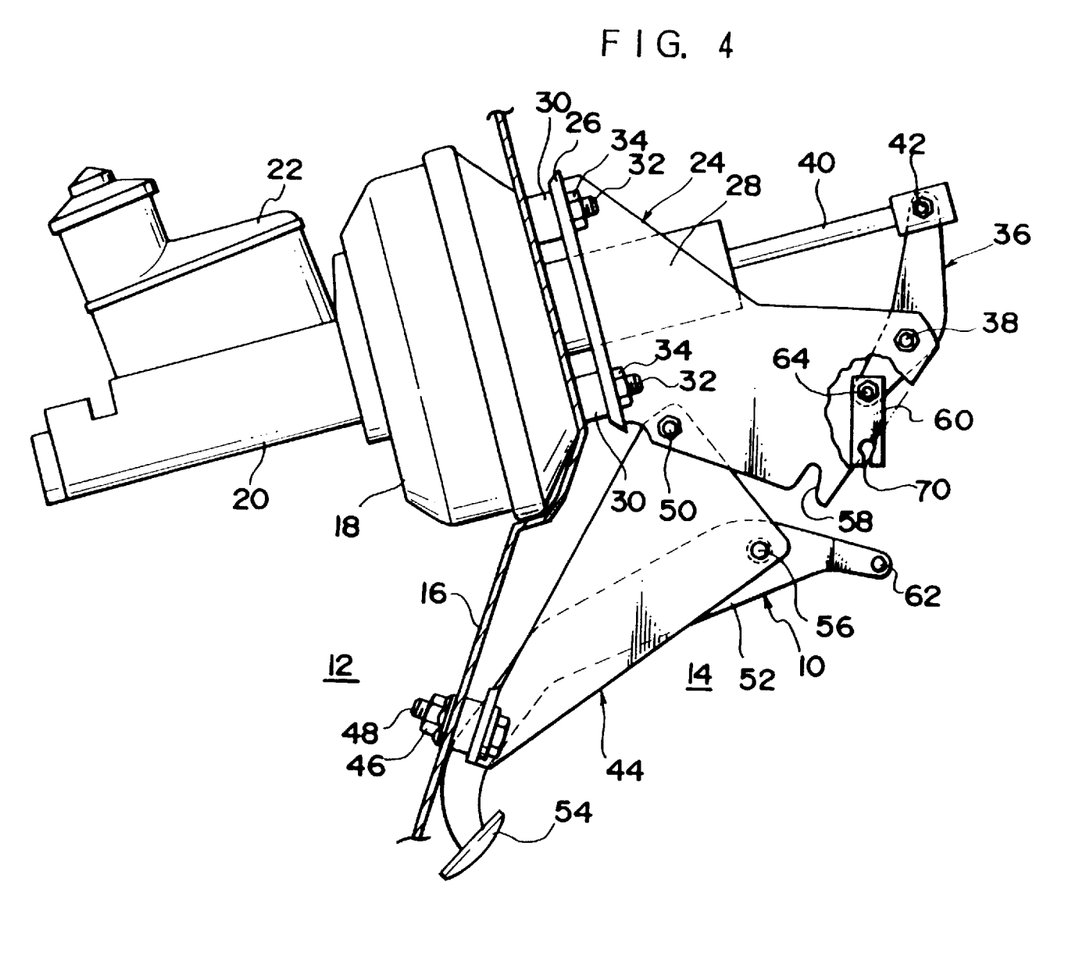
FIG. 4 is a side view of the structure of FIG. 3 showing a state after an external force greater than a predetermined value acts on the vehicle from the front side thereof.

As shown in FIGS. 3 and 4, the overall structure of the present embodiment is similar to that of the first embodiment. FIG. 3 is an enlarged side view of a main portion of the present embodiment.

In the present embodiment, among the holes which are formed at the opposite ends of the connection link 60 for engagement with the first and second connecting pins 62 and 64, the hole 70 formed for engagement with the first connecting pin 62 has a keyhole-like shape such that it is open to the exterior of the connecting link 60.

In the above-described structure, the peripheral portion of the hole 70 does not plastically deform during ordinary braking operation, so that ordinary braking operation is not hindered.

By contrast, when an external force greater than the predetermined value acts on the vehicle from the front side thereof, the link support 24 turns upward about the support shaft 50 in a manner similar to that of the first embodiment. Accordingly, there increases the distance between the rotation-center shaft 56 of the brake pedal 10 and the swing-center shaft 38 of the swing link 36.

In this case, when the connecting link 60 is brought substantially onto the line P connecting the rotation-center shaft 56 and the swing-center shaft 38 as shown in FIG. 2, and the link support 24 attempts to further turn upward about the support shaft 50, a tensile load acts on the peripheral portion of the hole 70 in the connecting link 60. Therefore, the peripheral portion of the hole 70 plastically deforms, resulting in a breakaway of the connecting link 60 from the first connecting pin 62, as shown in FIG. 4. Accordingly, the brake pedal 10 is released from the restricted state established by the connecting link 60. As a result, an inertial force acting on the brake pedal 10 substantially toward the front of the vehicle is utilized for displacing the pedal pad 54 substantially toward the front of the vehicle to an extent greater than that in the first embodiment.

In the present embodiment, only the hole 70 to be engaged with the first connecting pin 62 is formed into a keyhole-like shape in the connecting link 60. However, the present invention is not limited thereto. Only a hole to be engaged with the second connecting pin 64 or both holes may be formed into a keyhole-like shape.

Also, in the present embodiment, through the employment of the keyhole-shaped hole 70 formed in the connecting link 60, the connecting link 60 is allowed to break away, as needed, from the first connecting pin 62. However, the present invention is not limited thereto. A cut-away portion or a thin-walled portion may be provided in the connecting link 60 at its intermediate portion, so that the connecting link 60 breaks at its intermediate portion.

Third Embodiment

A third embodiment of present invention will next be described with reference to FIG. 5.

Figure 5:
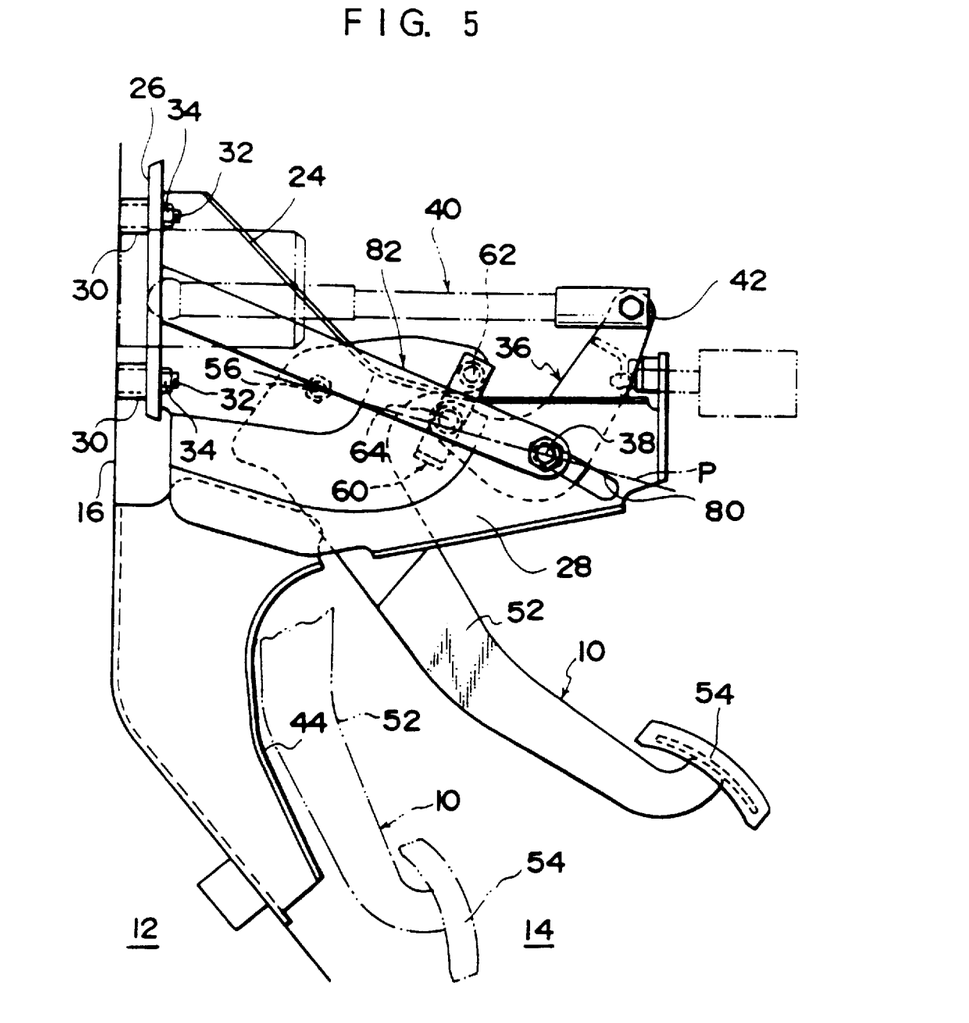
FIG. 5 is a side view showing a pedal support structure for a vehicle according to a third embodiment of the present invention.

As shown in FIG. 5, the overall structure of the present embodiment is substantially similar to that of the first embodiment except for the following. An elongated hole 80 is formed in the link support 24 such that it obliquely extends toward the rear of the vehicle, and the swing-center shaft 38 of the swing link 36 is positioned at the front end portion of the elongated hole 80. The base plate 26 of the link support 24 and the swing-center shaft 38 of the swing link 36 are connected by a push plate 82 which extends substantially along the longitudinal direction of the vehicle. Further, the first connecting pin 62, which connects the pedal support member 52 of the brake pedal 10 and the upper end portion of the connecting link 60, is offset substantially toward the top of the vehicle from the line P connecting the rotation-center shaft 56 of the brake pedal 10 and the swing-center shaft of the swing link 36.

In the present embodiment, the link support 24 and the pedal support 44 are not structured such that they are relatively pivotable. They are separate members, but are assembled into a single unit. Also, the rotation-center shaft 56 of the brake pedal 10 and the swing-center shaft 38 of the swing link 36 are both supported by the link support 24.

According to the above-described structure, ordinary braking operation is not hindered, since the swing-center shaft 38 is held by the push plate 82.

By contrast, when an external force greater than the predetermined value acts on the vehicle from the front side thereof, the dash panel 16 deforms toward the rear of the vehicle. Accordingly, the swing-center shaft 38 of the swing link 36 is moved by the push plate 82 substantially toward the rear of the vehicle along the elongated hole 80. Therefore, the swing link 36 is also displaced in the same direction, thereby pulling the second connecting pin 64 of the connecting link 60 in the same direction. Accordingly, the connecting link 60 draws the first connecting pin 62 toward the line P while turning, thereby applying a torque to the brake pedal 10 so as to move the pedal pad 54 substantially toward the front of the vehicle. Thus, the pedal pad 54 can be displaced substantially toward the front of the vehicle.

The structure of the present embodiment may be combined with that of the second embodiment such that the hole in the connecting link 60 is formed into a keyhole-like shape, or a cut-away portion or a thin-walled portion is provided at the intermediate portion of the connecting link 60.

While the embodiments of the present invention, as herein disclosed, constitute a preferred form, it is to be understood that other forms might be adopted.

What is claimed is:

1. A pedal support structure of a vehicle comprising:
    a pedal support fixed on a vehicle body and supporting a rotation-center shaft of a vehicle pedal;
    a swing link which is supported by a link support in a manner swingable about a swing-center shaft, one end portion of said swing link being connected to operating-force transmission means which transmits a treading force applied to a pad of the vehicle pedal to treading-force boosting means;
    a connecting link which connects the other end portion of said swing link and one end portion of said vehicle pedal opposite to the pad in a relatively rotatable manner, said connecting link transmitting a rotational force of said vehicle pedal, generated about said rotation-center shaft toward the front of the vehicle, to said operating-force transmission means via said swing link, and a connecting pin of said connecting link for connection with the end portion of said vehicle pedal opposite to the pad being offset substantially toward the front of the vehicle or toward the top of the vehicle from a line connecting said rotation-center shaft of said vehicle pedal and said swing-center shaft of said swing link; and
    said pedal support and said link support forming a displacement control means which operates, when an external force greater than a predetermined value acts on the front portion of the vehicle, so as to increase the distance between said rotation-center shaft and said swing-center shaft and to shift said connecting pin toward the line, thereby displacing the pad of said vehicle pedal.

2. A pedal support structure of a vehicle according to claim 1, wherein said treading-force boosting means is a brake booster, and said operating-force transmission means is a push rod projecting from said brake booster.

3. A pedal support structure of a vehicle according to claim 1, wherein said pedal support supporting said rotation-center shaft of said vehicle pedal and said link support supporting said swing-center shaft of said swing link and disposed above said pedal support, so that said link support is moved away from said pedal support when an external force greater than a predetermined value acts on the front portion of the vehicle.

4. A pedal support structure of a vehicle according to claim 3, wherein an upper front end portion of said pedal support is connected to a lower front end portion of said link support via a rotary support shaft in a relatively rotatable manner.

5. A pedal support structure of a vehicle according to claim 4, wherein an inverse-U-shaped cut-away portion is formed in a lower rear end portion of said link support, and said rotation-center shaft of said vehicle pedal provided on said pedal support is engaged with said cut-away portion in a relatively rotatable manner.

6. A pedal support structure of a vehicle according to claim 3, wherein said pedal support and said link support are formed as a single member having a crack-generating portion so that a portion of said single member corresponding to said link support separates from a portion of said single member corresponding to said pedal support when an external force greater than the predetermined value acts on the vehicle from the front side thereof.

7. A pedal support structure of a vehicle according to claim 1, wherein releasing means is further provided in order to release the connection, established by said connecting link, between the other end portion of said swing link and the end portion of said vehicle pedal opposite to the pad when the distance between said rotation-center shaft and said swing-center shaft increases.

8. A pedal support structure of a vehicle according to claim 7, wherein at least one of holes that are formed at opposite ends of said connecting link for engagement with said connecting pin and a second connecting pin for connection with the other end of said swing link is formed in a keyhole-like shape which is opened to a peripheral edge of said connecting link, thereby constituting said releasing means.

9. A pedal support structure of a vehicle according to claim 7, wherein said releasing means is a crack-generating portion provided in said connecting link at its intermediate portion.

10. A pedal support structure of a vehicle according to claim 1, wherein said displacement control means includes an elongated hole formed in said pedal support such that said swing-center shaft of said swing link is positioned at the front end of said elongated hole, and a push plate whose longitudinal direction approximately coincides with the longitudinal direction of the vehicle and which connects a base plate of said pedal support and said swing-center shaft of said swing link.

11. A pedal support structure of a vehicle comprising:
a pedal support fixed on a vehicle body and supporting a rotation-center shaft of a vehicle pedal;
a swing link which is supported by a link support in a manner swingable about a swing-center shaft, one end portion of said swing link being connected to operating-force transmission means which transmits a treading force applied to a pad of the vehicle pedal to treading-force boosting means;
a connecting link which connects the other end portion of said swing link and one end portion of said vehicle pedal opposite to the pad in a relatively rotatable manner, said connecting link transmitting a rotational force of said vehicle pedal, generated about said rotation-center shaft toward the front of the vehicle, to said operating-force transmission means via said swing link, and a connecting pin of said connecting link for connection with the end portion of said vehicle pedal opposite to the pad being offset substantially toward the front of the vehicle or toward the top of the vehicle from a line connecting said rotation-center shaft of said vehicle pedal and said swing-center shaft of said swing link;
said pedal support and said link support forming a displacement control means which operates, when an external force greater than a predetermined value acts on the front portion of the vehicle, so as to increase the distance between said rotation-center shaft and said swing-center shaft and to shift said connecting pin toward the line, thereby displacing the pad of said vehicle pedal; and
releasing means for releasing the connection, established by said connecting link, between the other end portion of said swing link and the end portion of said vehicle pedal opposite to the pad when the distance between said rotation-center shaft and said swing-center shaft increases, wherein
said pedal support supporting said rotation-center shaft of said vehicle pedal and said link support supporting said swing-center shaft of said swing link and disposed above said pedal support, so that said link support is moved away from said pedal support when an external force greater than a predetermined value acts on the front portion of the vehicle.

12. A pedal support structure of a vehicle according to claim 11, wherein said treading-force boosting means is a brake booster, and said operating-force transmission means is a push rod projecting from said brake booster.

13. A pedal support structure of a vehicle according to claim 11, wherein an upper front end portion of said pedal support is connected to a lower front end portion of said link support via a rotary support shaft in a relatively rotatable manner.

14. A pedal support structure of a vehicle according to claim 13, wherein an inverse-U-shaped cut-away portion is formed in a lower rear end portion of said link support, and said rotation-center shaft of said vehicle pedal provided on said pedal support is engaged with said cut-away portion in a relatively rotatable manner.

15. A pedal support structure of a vehicle according to claim 11, wherein said pedal support and said link support are formed as a single member having a crack-generating portion so that a portion of said single member corresponding to said link support separates from a portion of said single member corresponding to said pedal support when an external force greater than the predetermined value acts on the vehicle from the front side thereof.

16. A pedal support structure of a vehicle according to claim 11, wherein at least one of holes that are formed at opposite ends of said connecting link for engagement with said connecting pin and a second connecting pin for connection with the other end of said swing link is formed in a keyhole-like shape which is opened to a peripheral edge of said connecting link, thereby constituting said releasing means.

17. A pedal support structure of a vehicle according to claim 11, wherein said releasing means is a crack-generating portion provided in said connecting link at its intermediate portion.

18. A pedal support structure of a vehicle comprising:
a pedal support fixed on a vehicle body and supporting a rotation-center shaft of a vehicle pedal;
a swing link which is supported by a link support in a manner swingable about a swing-center shaft, one end portion of said swing link being connected to operating-force transmission means which transmits a treading force applied to a pad of the vehicle pedal to treading-force boosting means;
a connecting link which connects the other end portion of said swing link and one end portion of said vehicle pedal opposite to the pad in a relatively rotatable manner, said connecting link transmitting a rotational force of said vehicle pedal, generated about said rotation-center shaft toward the front of the vehicle, to said operating-force transmission means via said swing link, and a connecting pin of said connecting link for connection with the end portion of said vehicle pedal opposite to the pad being offset substantially toward the front of the vehicle or toward the top of the vehicle from a line connecting said rotation-center shaft of said vehicle pedal and said swing-center shaft of said swing link; and said pedal support and said link support forming a displacement control means which operates, when an external force greater than a predetermined value acts on the front portion of the vehicle, so as to increase the distance between said rotation-center shaft and said swing-center shaft and to shift said connecting pin toward the line, thereby displacing the pad of said vehicle pedal, said displacement control means including an elongated hole formed in said pedal support such that said swing-center shaft of said swing link is positioned at the front end of said elongated hole, and a push plate whose longitudinal direction approximately coincides with the longitudinal direction of the vehicle and which connects a base plate of said pedal support and said swing-center shaft of said swing link.

19. A pedal support structure of a vehicle according to claim 18, wherein said treading-force boosting means is a brake booster, and said operating-force transmission means is a push rod projecting from said brake booster.

20. A pedal support structure of a vehicle according to claim 18, wherein releasing means is further provided in order to release the connection, established by said connecting link, between the other end portion of said swing link and the end portion of said vehicle pedal opposite to the pad when the distance between said rotation-center shaft and said swing-center shaft increases.

* * * * *